(12) United States Patent
Zhong

(10) Patent No.: US 11,455,273 B2
(45) Date of Patent: Sep. 27, 2022

(54) MULTIMEDIA APPLICATION PROCESSOR ARCHITECTURE

(71) Applicant: Jiedong Zhong, Guangdong (CN)

(72) Inventor: Jiedong Zhong, Guangdong (CN)

( * ) Notice: Subject to any disclaimer, the term of this patent is extended or adjusted under 35 U.S.C. 154(b) by 97 days.

(21) Appl. No.: 16/919,120

(22) Filed: Jul. 2, 2020

(65) Prior Publication Data

US 2021/0374090 A1    Dec. 2, 2021

(30) Foreign Application Priority Data

Jun. 2, 2020 (CN) .......................... 202010467558.6

(51) Int. Cl.

| | |
|---|---|
| *G06F 15/76* | (2006.01) |
| *G06F 15/80* | (2006.01) |
| *G06F 1/3209* | (2019.01) |
| *G06F 1/3234* | (2019.01) |
| *G06F 1/3287* | (2019.01) |
| *G06F 9/38* | (2018.01) |
| *H04W 52/02* | (2009.01) |

(52) U.S. Cl.
CPC ............ *G06F 15/80* (2013.01); *G06F 1/3209* (2013.01); *G06F 1/3243* (2013.01); *G06F 1/3287* (2013.01); *G06F 9/3885* (2013.01); *H04W 52/0229* (2013.01)

(58) Field of Classification Search
CPC ...... G06F 15/80; G06F 1/3209; G06F 1/3243; G06F 1/3287; G06F 9/3885; H04W 52/0229

IPC ........................................................ G06F 17/00
See application file for complete search history.

(56) References Cited

U.S. PATENT DOCUMENTS

| | | | |
|---|---|---|---|
| 2021/0097641 A1* | 4/2021 | Iyer ........................ | G06F 9/4806 |
| 2021/0184795 A1* | 6/2021 | Ibars Casas .......... | H04W 88/06 |
| 2021/0201466 A1* | 7/2021 | Chen ..................... | G06T 7/0002 |
| 2021/0279055 A1* | 9/2021 | Saxena ................. | H04L 9/0631 |
| 2021/0287423 A1* | 9/2021 | Guenther ............... | G06F 7/485 |
| 2021/0287429 A1* | 9/2021 | Vaidyanathan ........ | G06T 17/10 |
| 2021/0287431 A1* | 9/2021 | Woop ..................... | G06T 15/08 |
| 2021/0295463 A1* | 9/2021 | Mandal ................. | G06T 15/005 |
| 2021/0295583 A1* | 9/2021 | Vaidyanathan ........ | G06T 15/06 |

* cited by examiner

*Primary Examiner* — Cheng Yuan Tseng

(57) ABSTRACT

This disclosure provides a multimedia application processor architecture, comprising a master control system, at least two groups of independent multimedia application processors, at least two groups of common CPU, a power manager, and a common interface and CPU bus, wherein the master control system is connected to each group of the independent multimedia application processors, each group of the common CPU, the power manager, and the common interface and CPU bus respectively, and is configured to control and manage, and provide power control and management for, the at least two groups of independent multimedia application processors, the at least two groups of common CPU, the power manager, and the common interface and CPU bus, each group of the common CPU is connected to the independent multimedia application processors for providing a backup central processor data processing capability for the independent multimedia application processors.

7 Claims, 1 Drawing Sheet

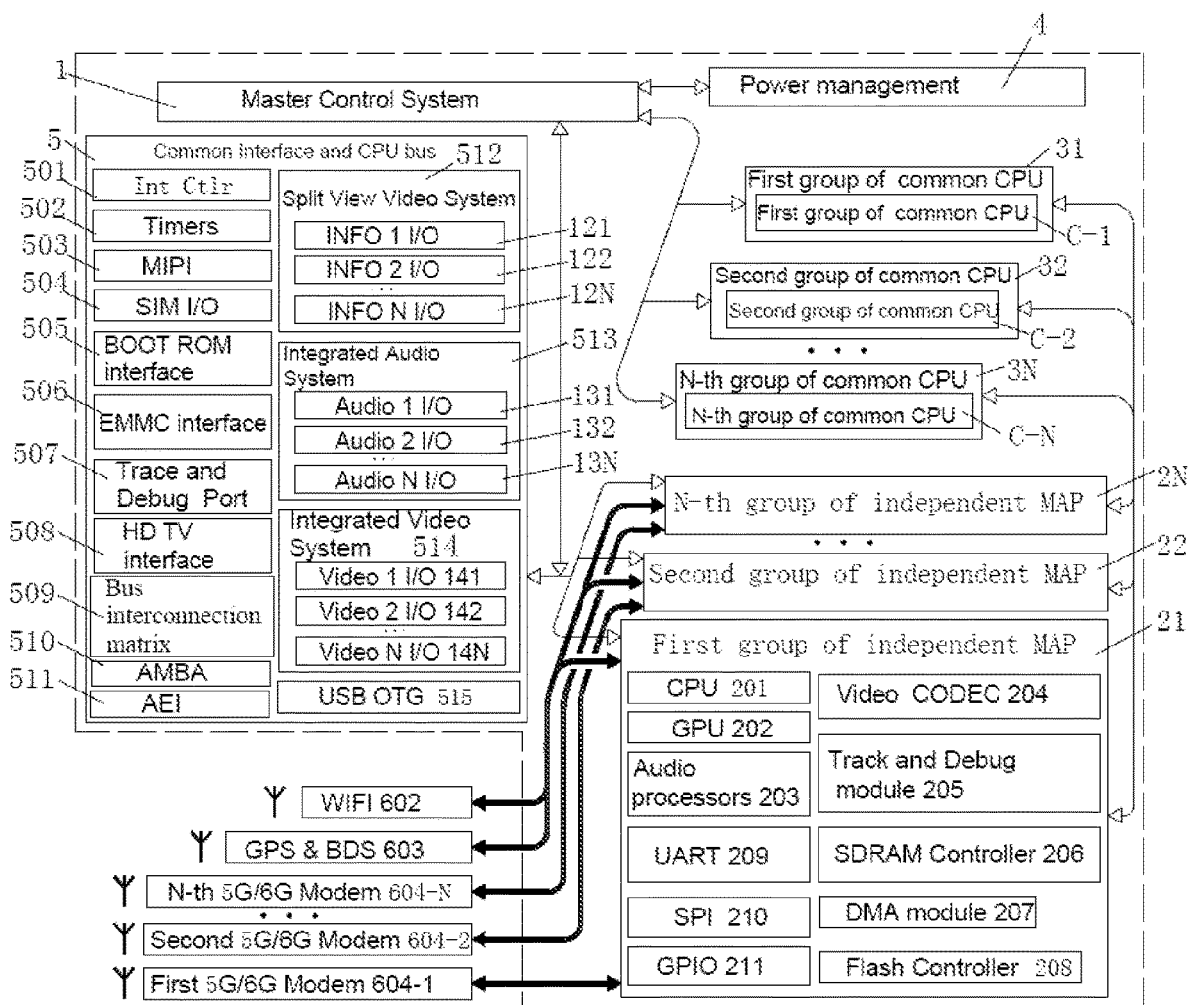

MULTIMEDIA APPLICATION PROCESSOR ARCHITECTURE

CROSS REFERENCE TO RELATED APPLICATIONS

The present application claims the benefit of Chinese Patent Application No. 202010467558.6 filed on Jun. 2, 2020, the contents of which are incorporated herein by reference in their entirety.

FIELD OF THE DISCLOSURE

The present disclosure relates generally to application processor filed. More specifically, the present disclosure relates to a multimedia application processor architecture.

BACKGROUND OF THE DISCLOSURE

In the current application processor, only a group of baseband signals, Bluetooth, WiFi, GPS or BDS can be processed. Today, the application processor can only process a group of baseband signals because the current application processor architecture can not support multiple groups of baseband signals. As a result, the device can not accept multiple work tasks and requirements simultaneously, which affects the processing efficiency of work tasks. For example, when you use a mobile phone to communicate, you can't do other work with the mobile phone, because the mobile phone RF component, baseband component, and processor component currently only support a group of baseband signals for interactive communication.

SUMMARY

In One embodiment, the present disclosure provides a multimedia application processor architecture, comprising a master control system, at least two groups of independent multimedia application processors (Independent MAP), at least two groups of common CPU, a power manager, and a common interface and CPU bus, wherein the master control system is connected to each group of the independent multimedia application processors, each group of the common CPU, the power manager, and the common interface and CPU bus respectively, and is configured to control and manage, and provide power control and management for, the at least two groups of independent multimedia application processors, the at least two groups of common CPU, the power manager, and the common interface and CPU bus, each group of the common CPU is connected to the independent multimedia application processors for providing a backup central processor data processing capability for the independent multimedia application processors, each group of the independent multimedia application processors can independently process WIFI, GPS/BDS positioning, and one group of 5G or 6G modem signals, and multiple groups of the independent multimedia application processors can independently process WIFI, GPS/BDS positioning, and multiple groups of 5G or 6G modem signals, such that a device can simultaneously process multiple work tasks and needs in parallel; Each group of the independent multimedia application processors comprises at least a CPU, a graphics processing unit (GPU), an audio processor, a video encoder+decoder (Video CODEC), a track and debug module, a synchronous dynamic random access memory controller (SDRAM Controller), a direct memory access module (DMA), a flash memory, a universal asynchronous receiver/transmitter (UART), a serial peripheral interface (SPI), and a general purpose input/output port (GPIO) Each group of the common CPU is composed of one group of common processors; when the CPU of the independent application processor itself reaches a limit of processing capabilities, the master control system immediately requisitions the common CPU to join in a common data processing work task; when a first group of the common CPU requisitioned also reaches a limit of data processing capabilities, the master control system requisitions a second group of common CPU again to join in the data processing work task until the work need of cooperating with the independent multimedia application processors is met; and so on, such that the common CPU are managed to cooperate with the independent multimedia application processors to complete the work task; and when the work task is reduced, the master control system reduces the number of the common CPU requisitioned until the independent multimedia application processors can complete the data processing work task by themselves, in which case the common CPU are no longer requisitioned.

In another further embodiment, the common interface and CPU bus cooperates with each group of the independent multimedia application processors to complete the work task and provides each group of the independent multimedia application processors with independent processing and outputting/inputting of various signals.

In another further embodiment, the common interface and CPU bus comprises at least internal controller (Int Ctlr), a timer, a mobile industry processor interface (MIPI), a SIM card interface I/O, a diskless boot ROM interface (BOOT ROM interface), an embedded multi media card interface, a trace and debug port, a high-definition TV interface (HD TV interface), a bus interconnection matrix, an advanced microcontroller bus architecture (AMBA), an advanced expandable interface interconnection (AXI Interconnect), a split view video system, an integrated audio system, an integrated video system, and a USB On-The-Go port (USB OTG); and the common interface and CPU bus can cooperate with multiple groups of the independent multimedia application processors to perform processing and outputting/inputting of signals, such that the device can simultaneously input and output multiple groups of signal data in parallel, so as to process multiple work tasks and needs in parallel for the device.

In another further embodiment, the split view video system comprises multiple groups of information input/output interfaces (INFO I/O), the integrated audio system comprises multiple groups of audio input/output interfaces (Audio I/O), and the integrated video system comprises multiple groups of video input/output interfaces (Video I/O).

In another further embodiment, the power manager accepts the control and management of the master control system, and the power manager provides a power supply service for the application processor.

In another embodiment, when the application processor is in standby, the master control system provides a power supply service for the first group of the independent multimedia application processors, and remaining multiple groups of the independent multimedia application processors are in a power-off state; when input signals comprising WIFI, GPS/BDS positioning, and one group of 5G or 6G modem signals are input to the first group of the independent processors for work, the second group of the independent multimedia application processors is in a standby power supply state; there is always a group of independent multimedia application processors being kept in the standby power supply state; and so on, such that an additive power supply management service is performed on the independent multimedia application processors; and when the input signals are reduced, one group of the independent multimedia application processors is reserved to provide the standby power supply state until the inputting of multiple groups of signals stops, in which case the standby power supply state of the first group of the independent processors is retained.

In another embodiment, when any group of the independent multimedia application processors reaches a limit of data processing capabilities, the master control system immediately requisitions and provides a power supply service for one group of the common CPU to join in a data processing work; when the first group of common CPU requisitioned reaches the limit of data processing capabilities, the master control system requisitions the second group of common CPU to join in the data processing work until the work need is met; and when the data processing task is reduced, the master control system stops requisitioning the common CPU until the independent multimedia application processors can meet their own needs for data processing, in which case the master control system stops requisitioning all the common CPU, and the master control system adopts, for the power supply of the common CPU, a management method of supplying power immediately upon requisitioning while stopping power supply immediately upon stopping requisitioning.

BRIEF DESCRIPTION OF THE DRAWINGS

In order to explain the embodiment of the disclosure or the technical solution in the prior art more clearly, the following will make a brief introduction to the appended drawings needed in the embodiment or the prior art description. Obviously, the appended drawings in the following description are only some embodiments of the disclosure. Extra drawings which can be obtained without any additional workforce for those skilled people in the prior art are incorporated in this disclosure.

The sole FIGURE illustrates a structural diagram of the multimedia application processor architecture according to an embodiment of the present disclosure.

DETAILED DESCRIPTION OF THE DISCLOSURE

The specific embodiments of the disclosure will be further described in combination with the appended drawings and embodiments. The following embodiments are only used to explain the technical solution of the disclosure more clearly, and cannot limit the protection scope of the disclosure.

Herein provided the structural presentation of embodiment for the multimedia application processor architecture as referring to the sole FIGURE. As shown in the sole FIGURE, the multimedia application processor architecture comprises a master control system 1, at least two groups of independent multimedia application processors (independent MAP), at least two groups of common CPU, a power manager 4, and a common interface and CPU bus 5. As an example, the sole FIGURE shows N groups of the independent multimedia application processors and N groups of the common CPU. The N groups of the independent multimedia application processors comprise the first group of independent multimedia application processors (the first group of independent MAP) 21, the second group of independent multimedia application processors (the second group of independent MAP 22, . . . , the N-th group of independent multimedia application processors (the N-th group of independent MAP) 2N. The N groups of the common CPU comprise of the first group of common CPU 31, the second group of common CPU 32, . . . , the N-th group of common CPU 3N. N is an integer greater than 1. Of course, in practical application, the size of N can be increased or decreased according to the specific situation.

The master control system 1 system is connected to each group of the independent multimedia application processors, each group of the common CPU, the power manager 4, and the common interface and CPU bus 5 respectively. The master control system 1 system is configured to control and manage, and provide power control and management for, the at least two groups of independent multimedia application processors, the at least two groups of common CPU, the power manager 4, and the common interface and CPU bus 5. Each group of the common CPU is connected to a group of independent multimedia application processors (independent MAP) for providing a backup central processor data processing capability for the independent multimedia application processors. Each group of the independent multimedia application processors can independently process WIFI 602, GPS/BDS 603 positioning, and one group of 5G/6G modem signals such as the first 5G/6G modem 604-1, the second 5G/6G modem 604-2, . . . , the N-th 5G/6G modem 604-N and multiple groups of the independent multimedia application processors can independently process WIFI 602, GPS/BDS 603 positioning, and multiple groups of 5G/6G modem signals, such that a device can simultaneously process multiple work tasks and needs in parallel. The disclosure can process multiple independent modem signals in parallel at the same time, can process multiple work tasks or requirements for the equipment in parallel at the same time, and improves the processing efficiency of work tasks.

Each group of the independent multimedia application processors comprises at least a CPU 201, a graphics processing unit (GPU) 202, an audio processor 203, a video encoder+decoder (Video CODEC) 204, a track and debug module 205, a synchronous dynamic random access memory controller (SDRAM controller) 206, a direct memory access module (DAM module) 207, a flash memory 208, a universal asynchronous receiver/transmitter (UART) 209, a serial peripheral interface (SPI) 210, and a general purpose input/output port (GPIO) 211. Each group of the independent multimedia application processors can independently process WIFI, GPS/BDS positioning, and one group of 5G/6G modem signals, and multiple groups of the independent multimedia application processors can independently process WIFI 602, GPS/BDS 603 positioning, and multiple groups of 5G/6G modem signals, such that a device can simultaneously process multiple work tasks and needs in parallel.

Each group of the common CPU is composed of one group of common processors. For example, the first group of common CPU 31 is composed of first common CPU C-1, the second group of common CPU 32 is composed of second common CPU C-2, . . . , the N-th group of common CPU 3N is composed of first common CPU C-N.

When the CPU of the independent application processor itself reaches the limit of processing capabilities, the master control system 1 immediately requisitions the common CPU to join in a common data processing work task. When a first group of the common CPU requisitioned also reaches the limit of data processing capabilities, the master control system 1 requisitions a second group of common CPU again to join in the data processing work task until the work need of cooperating with the independent multimedia application processors is met; and so on, such that the common CPU are managed to cooperate with the independent multimedia application processors to complete the work task, And when the work task is reduced, the master control system 1 reduces the number of the common CPU requisitioned until the independent multimedia application processors can complete the data processing work task by themselves, in which case the common CPU are no longer requisitioned.

In this embodiment, the common interface and CPU bus 5 cooperates with each group of the independent multimedia application processors to complete the work task and provides each group of the independent multimedia application processors with independent processing and outputting/inputting of various signals.

The common interface and CPU bus 5 comprises at least internal controller 501, a timer 502, a mobile industry processor interface 503, a SIM card interface I/O 504, a diskless boot ROM interface 505, an embedded multi media card interface (EMMC interface) 506, a trace and debug port 507, a high-definition TV interface 508, a bus interconnection matrix 509, an advanced microcontroller bus architecture (AMBA) 510, an advanced expandable interface interconnection (AXI) 511, a split view video system 512, an integrated audio system 513, an integrated video system 514, and a USB On-The-Go port 515; and the common interface and CPU bus 5 can cooperate with multiple groups of the independent multimedia application processors to perform processing and outputting/inputting of signals, such that the device can simultaneously input and output multiple groups of signal data in parallel, so as to process multiple work tasks and needs in parallel for the device.

The split screen video system 512 includes a plurality of information interfaces, i.e. as shown in the sole FIGURE, the first information interface (INFO 1 I/O) 121, the second information interface (INFO 2 I/O) 122, . . . , the Nth information interface ((INFO N I/O) 12N. The integrated audio system 513 includes a plurality of audio interfaces, i.e. as shown in the sole FIGURE, the first audio interface (Audio 1 I/O) 131, the second audio interface (Audio 2 I/O) 132 . . . , the Nth audio interface (Audio N I/O) 13N. The integrated video system 514 includes a plurality of sets of video interfaces, namely, as shown in the sole FIGURE, the first video interface 141 (Audio 1 I/O), the second video interface (Audio 2 I/O) . . . , the nth video interface (Audio N I/O).

The power manager 4 receives the control and management of master control system 1. The power manager 4 provides power supply service for application processor.

The application processor is in standby, the master control system 1 provides a power supply service for the first group of the independent multimedia application processors, and the remaining multiple groups of the independent multimedia application processors are in a power-off state. When input signals comprising WIFI, GPS/BDS positioning, and one group of 5G/6G modem signals are input to the first group of the independent processors for work, the second group of the independent multimedia application processors is in a standby power supply state. There is always a group of independent multimedia application processors being kept in the standby power supply state; and so on, such that an additive power supply management service is performed on the independent multimedia application processors. When the input signals are reduced, one group of the independent multimedia application processors is reserved to provide the standby power supply state until the inputting of multiple groups of signals stops, in which case the standby power supply state of the first group of the independent processors is retained.

When any group of the independent multimedia application processors reaches the limit of data processing capabilities, the master control system 1 immediately requisitions, and provides a power supply service for, one group of the common CPU to join in a data processing work. When the first group of common CPU requisitioned reaches the limit of data processing capabilities, the master control system 1 requisitions the second group of common CPU to join in the data processing work until the work need is met. And when the data processing task is reduced, the master control system 1 stops requisitioning the common CPU until the independent multimedia application processors can meet their own needs for data processing, in which case the master control system 1 stops requisitioning all the common CPU, and the master control system 1 adopts, for the power supply of the common CPU, a management method of supplying power immediately upon requisitioning while stopping power supply immediately upon stopping requisitioning.

In summary, in this embodiment, the multimedia application processor architecture can process multiple groups of independent modem signals in parallel at the same time, and accept multiple work tasks and requirements for the device in parallel at the same time. The multimedia application processor architecture can process multiple modem signals, WiFi 602, GPS or BDS 603 in parallel. The multimedia application processor architecture is composed of multiple groups of parallel independent multimedia application processors, each group of independent multimedia application processors can process a group of modem signals, and multiple groups of independent multimedia application processors can simultaneously process multiple groups of independent baseband signals, that is, the application processor can simultaneously process multiple work tasks or requirements for the device. To sum up, the invention can process multiple independent modem signals in parallel at the same time, can process multiple work tasks or requirements for the equipment in parallel at the same time, and improves the processing efficiency of work tasks.

The application processor can receive multiple groups of modem signals for parallel processing, and the radio frequency component and modem component can also receive multiple groups of signals for communication in parallel. The current 5G/6G MIMO (multi-input and multi-output) technology can support the above software/hardware for signal communication. The application processor can define the future mobile phone form. In the process of phone communication, the mobile phone can also play games, have video conference, and communicate with the third party and the fourth party, realizing parallel processing of multiple tasks and requirements in one mobile phone.

The above is only a better embodiment of the invention and does not limit the invention. Any modification, equivalent replacement, improvement, etc. made within the spirit and principles of the invention shall be included in the protection scope of the invention.

What is claimed is:

1. A multimedia application processor architecture, comprising a master control system, at least two groups of independent multimedia application processors, at least two groups of common CPU, a power manager, and a common interface and CPU bus, wherein the master control system is connected to each group of the independent multimedia application processors, each group of the common CPU, the power manager, and the common interface and CPU bus respectively, and is configured to control and manage, and provide power control and management for, the at least two groups of independent multimedia application processors, the at least two groups of common CPU, the power manager, and the common interface and CPU bus, each group of the common CPU is connected to the independent multimedia application processors for providing a backup central processor data processing capability for the independent multimedia application processors, each group of the independent multimedia application processors can independently process Wireless Fidelity (WIFI), Global Positioning System/BeiDou Navigation Satellite System (GPS/BDS) positioning, and one group of 5G or 6G modem signals, and multiple groups of the independent multimedia application processors can independently process WIFI, GPS/BDS positioning, and multiple groups of 5G or 6G modem signals, such that a device can simultaneously process multiple work tasks and needs in parallel; each group of the independent multimedia application processors comprises at least a CPU, a graphics processing unit (GPU), an audio processor, a video encoder+decoder (Video CODEC), a track and debug module (DMA module), a synchronous dynamic random access memory controller (SDRAM controller), a direct memory access module (DMA module), a flash memory, a universal asynchronous receiver/transmitter (UART), a serial peripheral interface (SPI), and a general purpose input/output port (GPIO); each group of the common CPU is composed of one group of common processors; when the CPU of the independent application processor itself reaches a limit of data processing capabilities, the master control system immediately requisitions the common CPU to join in a common data processing work task; when a first group of the common CPU requisitioned also reaches a limit of data processing capabilities, the master control system requisitions a second group of common CPU again to join in the data processing work task until the work need of cooperating with the independent multimedia application processors is met; and so on, such that the common CPU are managed to cooperate with the independent multimedia application processors to complete the work task; and when the work task is reduced, the master control system reduces the number of the common CPU requisitioned until the independent multimedia application processors can complete the data processing work task by themselves, in which case the common CPU are no longer requisitioned.

2. The multimedia application processor architecture according to claim 1, wherein the common interface and CPU bus cooperates with each group of the independent multimedia application processors to complete the work task and provides each group of the independent multimedia application processors with independent processing and outputting/inputting of various signals.

3. The multimedia application processor architecture according to claim 2, wherein the common interface and CPU bus comprises at least internal controller (Int Ctlr), a timer, a mobile industry processor interface (MIPI), a Subscriber Identity Module (SIM) card interface I/O, a diskless boot Read-Only Memory interface (BOOT ROM interface), an embedded multi media card interface (EMMC interface), a trace and debug port, a high-definition TV interface (HD TV interface), a bus interconnection matrix, an advanced microcontroller bus architecture (AMBA), an advanced expandable interface interconnection (AEI), a split view video system, an integrated audio system, an integrated video system, and a Universal Serial BUS (USB) On-The-Go port; and the common interface and CPU bus can cooperate with multiple groups of the independent multimedia application processors to perform processing and outputting/inputting of signals, such that the device can simultaneously input and output multiple groups of signal data in parallel, so as to process multiple work tasks and needs in parallel for the device.

4. The multimedia application processor architecture according to claim 3, wherein the split view video system comprises multiple groups of information input/output interfaces, the integrated audio system comprises multiple groups of audio input/output interfaces, and the integrated video system comprises multiple groups of video input/output interfaces.

5. The multimedia application processor architecture according to claim 4, wherein the power manager accepts the control and management of the master control system, and the power manager provides a power supply service for the application processor.

6. The multimedia application processor architecture according to claim 1, wherein when the application processor is in standby, the master control system provides a power supply service for the first group of the independent multimedia application processors, and remaining multiple groups of the independent multimedia application processors are in a power-off state; when input signals comprising WIFI, GPS/BDS positioning, and one group of 5G or 6G modem signals are input to the first group of the independent processors for work, the second group of the independent multimedia application processors is in a standby power supply state; there is always a group of independent multimedia application processors being kept in the standby power supply state; and so on, such that an additive power supply management service is performed on the independent multimedia application processors; and when the input signals are reduced, one group of the independent multimedia application processors is reserved to provide the standby power supply state until the inputting of multiple groups of signals stops, in which case the standby power supply state of the first group of the independent processors is retained.

7. The multimedia application processor architecture according to claim 1, wherein when any group of the independent multimedia application processors reaches a limit of data processing capabilities, the master control system immediately requisitions and provides a power supply service for one group of the common CPU to join in a data processing work; when the first group of common CPU requisitioned reaches a limit of data processing capabilities, the master control system requisitions the second group of common CPU to join in the data processing work until the work need is met; and when the data processing task is reduced, the master control system stops requisitioning the common CPU until the independent multimedia application processors can meet their own needs for data processing, in which case the master control system stops requisitioning all the common CPU, and the master control system adopts, for the power supply of the common CPU, a management method of supplying power immediately upon requisitioning while stopping power supply immediately upon stopping requisitioning.

* * * * *